United States Patent [19]

Mas

[11] Patent Number: 4,589,371

[45] Date of Patent: May 20, 1986

[54] APPARATUS FOR GATHERING EGGS IN BANK OF CAGES FOR CHICKENS

[76] Inventor: Antonio S. Mas, Carretera de Villaverde a Vallecas, 295, 28031 Madrid, Spain

[21] Appl. No.: 670,151

[22] Filed: Nov. 9, 1984

[30] Foreign Application Priority Data

Nov. 14, 1983 [ES] Spain .................................. 527259

[51] Int. Cl.⁴ .............................................. A01K 31/16
[52] U.S. Cl. ..................................................... 119/48
[58] Field of Search ........................ 119/17, 21, 22, 48

[56] References Cited

U.S. PATENT DOCUMENTS

| | | | |
|---|---|---|---|
| 2,745,379 | 5/1956 | Schmidt | 119/48 |
| 3,111,215 | 11/1963 | Tellefson | 119/48 X |
| 3,485,214 | 12/1969 | Burkholder | 119/48 |
| 4,199,051 | 4/1980 | Kimberley | 119/48 X |
| 4,258,839 | 3/1981 | Niederer et al. | 119/48 X |

Primary Examiner—Robert P. Swiatek
Attorney, Agent, or Firm—Renner, Kenner, Greive, Bobak & Taylor

[57] ABSTRACT

Apparatus for gathering eggs in banks of cages for chickens, in which only an endless coupling chain is utilized, whose advancing run slides in front of the exits of the cages of one row in a stage, and the reverse run slides in front of the exits of the cages of the other row in the same stage. The arrangement provides the possibility that the chains of each of a plurality of stages onto which arms are fixed for the support of the eggs and the discharge of the eggs at a same level on a general conveyor belt. As an alternate embodiment, a cable is provided on which equidistant arms are moulded from plastic material, so as to form a train of cross-bars apt to receive and displace the eggs arriving from the cages.

12 Claims, 10 Drawing Figures

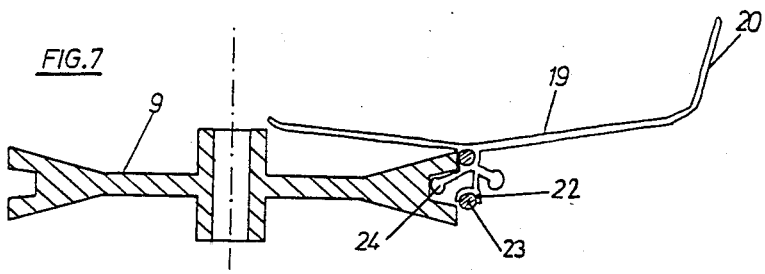
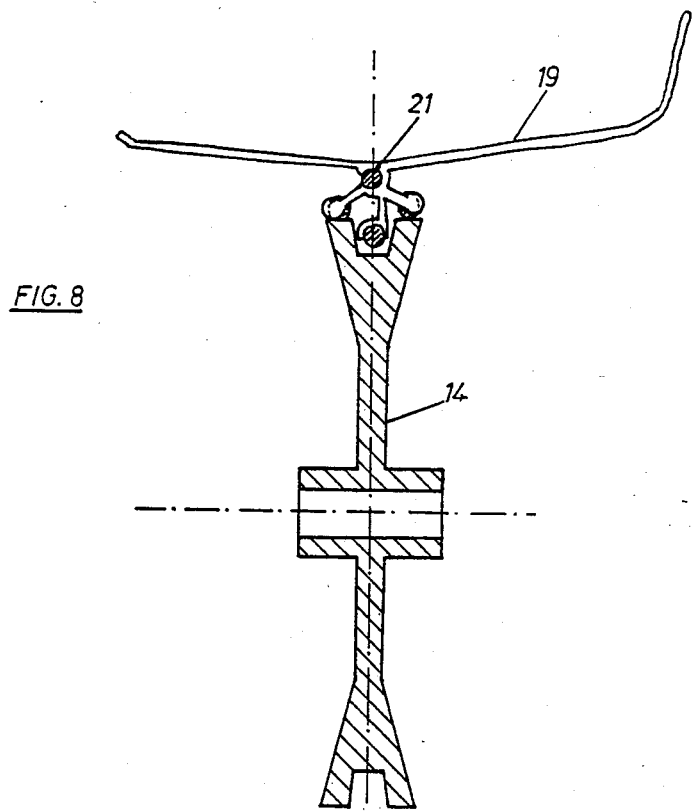

APPARATUS FOR GATHERING EGGS IN BANK OF CAGES FOR CHICKENS

TECHNICAL FIELD

The present invention relates to a plant for gathering eggs in banks of cages for chickens, especially applicable to poultry-farming.

BACKGROUND ART

The banks of cages for poultry-farming are generally composed by one or more stages of cages. On each stage, two rows of cages are located, their distance varying, in the case of more than one stage, in order to avoid the correspondence in the vertical direction of the cages pertaining to different stages. Normally, the distance between the two rows of cages increases in each stage in the descending direction. The various cages are arranged in a supporting structure, in such a way that the external wall of all the cages pertaining to a row lay in a coplanar position. Furthermore, the stage of said cages has a slight inclination toward said external wall. The external wall does not reach the stage, so as to provide at the bottom a front opening through which the eggs go out, rolling on the sloping bottom of the cage, which extends slightly from said opening, in order to form an exit ramp. The ramps of all the cages of a same row are coplanar, with the free edge aligned. Adjoining this free edge, along each row of cages, a conveyor belt circulates, provided for gathering the eggs from the various cages.

Till at present, for the gathering of the eggs in the banks of the above-mentioned type, two belts are provided in each stage. Each belt slides in front of one of the rows of each stage and is arranged between end wheels or rollers having a horizontal axis, with an upper advancing run, which slides next to the exit ramps of the cages, for the gathering of the eggs, and a lower reverse run. With this arrangement, only the advancing run of each belt is usable, which requires a go and back belt for each row of cages.

On the other hand, the advancing run of the belts pertaining to rows of cages placed on different stages, terminates at different levels, it being necessary to provide means which gather the eggs proceeding from the different belts and arrange them on a same plane.

Generally, the poultry-farming plants comprise numerous banks parallel to one another, placing a general conveyor belt for the gathering of the eggs proceeding from the various cages. In order to achieve the complete mechanization of the plant, it is necessary to arrange between each bank and the general conveyor belt a bucket device or the like, which receives the eggs from the belts of the cages situated at different levels and places the same at the level of the general conveyor belt, into which they slide.

DISCLOSURE OF THE INVENTION

An object of the present invention is to realize a plant for gathering eggs in banks of the above-mentioned type, in which only a transfer device is necessary for each stage of the bank, employing for the gathering of the eggs both the advancing run and the reverse run of said device.

Another object of the invention is to provide a plant in which the auxiliary means arranged between each bank of cages and the general conveyor belt are avoided.

According to the present invention, in each stage of the bank only one endless coupling chain is arranged, the advancing run of which slides in front of the exits of the cages of one side, while the reverse run slides in front of the exits of the cages of the opposite side. The two runs preferably are placed in a same horizontal plane.

The above-mentioned coupling chain slides on guides which are fixed to said bank and encircles said bank on one of the shorter sides, in the same plane as the advancing and reverse runs, whereby it abuts upon pads or wheels having vertical axes for the change of direction. On the opposite shorter side of the bank, the two runs of the coupling chain, both the advancing and the reverse, are extended to pass through a group of traction and change of direction wheels. The advancing runs carrying the eggs of all the chains of the various stages arrive to a group of wheels having horizontal axes, for the change of direction which causes the reversal of said advancing runs and their discharge on the same plane receiving the eggs, formed by the general conveyor belt.

With above-mentioned arrangement, the gathering of the eggs from the two rows of cages of each stage of the bank, is obtained with only one chain, instead of the two belts or chains as was previously conventional.

On the other hand, the extension of the advancing and reverse runs of the chain of each stage, starting from one of the shorter sides of the bank, is realized along sloping runs which reach the wheels for the change of direction having common horizontal axes, where they discharge into the general conveyor belt, thus eliminating the bucket devices or the like used till now to place the eggs of the different belts of each bank at the level of the general conveyor belt.

The coupling chain of each stage is formed by a chain of links and a plurality of equidistant transverse arms, preferably in plastic material, fixed on the upper part in alternate links, one in each link. Preferably, the transverse arms are fixed in the links that run along a vertical plane in the advancing and reverse runs of the coupling chain. These transverse arms define a train of parallel cross-bars which have the task of receiving and displacing the eggs arriving from the cages.

As noted, the advancing and reverse runs of the coupling chains slide, in each stage, from the cages, upon guides which are formed from a trough-shaped section, with walls substantially arranged as a V, which extend, starting from its free longitudinal edge, in corresponding flanges slightly converging, forming an obtuse angle with said walls. The maximum width of said trough is slightly wider than the width of the links, while the maximum height of the trough is slightly smaller than the dimension of said links. With this arrangement, the links which circulate in the advancing and reverse runs of the chain in a vertical direction overhang slightly from the trough that acts as a guide. In this upper branch of the vertical links that projects from the trough, the cross-bars are fixed.

The transverse arms that form the cross-bars have, in the area of connection with the links, lateral projections which are arranged on both sides of said links and are substantially coplanar with the links devoid of arms, that slide along horizontal planes in the advancing and reverse runs of the chain. The lateral projections overhang slightly from the horizontal links in order to act as support pads against the inner surface of the guide trough in the area of maximum width of the same.

With the described arrangement, the entirety of the links result spaced from the inner surface of said trough, against which abut only the lateral projections of the transverse arms, preferably obtained, as above-mentioned, from plastic material.

In general, the troughs which act as guides of the chain are metallic. The same holds for the links of the chain. By dimensioning the links and the troughs in the above-noted form, the friction between the links and the inner surface of the troughs is avoided, since the chain is supported by the lateral projections of the arms, of plastic material, whereby a sliding of the chain is obtained with lower friction and very noiselessly.

The troughs which act as guides for the advancing and reverse runs of the coupling chain are mounted on arms which are fixed to the cages and to the frame of the bank.

The coupling chain can also be formed by a cable, preferably metallic, upon which are transversely fixed the arms, conformed to define a train of links apt to receive and displace the eggs arriving from the cages.

In this case, the arms, also obtained from a plastic material, are moulded on the corresponding cable forming, underneath said arms, slides for the displacement upon the guides.

For a better understanding of the structure and the advantages of the plant according to this invention, a more detailed description of the same will follow, with reference to the accompanying drawings in which it is shown an embodiment given as non-limiting example.

BRIEF DESCRIPTION OF THE DRAWINGS

FIG. 7 is a diametral cross-section of a reversal pulley in a horizontal plane.

FIG. 8 is a diametral cross-section of a pulley for changing the inclination of the conveyor chain.

PREFERRED EMBODIMENT FOR CARRYING OUT THE INVENTION

Figure 1:
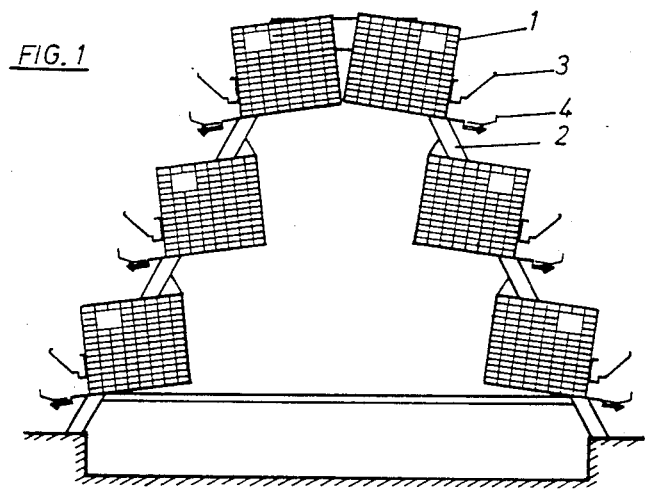
FIG. 1 is a schematic front elevation of a bank of cages according to a conventional construction and arrangment.

In FIG. 1 is shown, in a front view, a bank of cages 1 of conventional construction. This bank comprises three stages of cages and in each of these stages there are two rows of cages, whose distance increases progressively toward the lower stages, so that the cages in the various stages are not in superimposed or coincident positions. The length of the cages 1 in each row depends on the dimensions of the poultry-farming plant. Generally, in each row of cages 1, these lean laterally to obtain the desired length.

All the cages are mounted in a structure or support frame 2.

In front of each row of cages the manger 3 for the chickens is mounted, as well as a belt 4 for gathering the eggs.

The banks of cages for chickens can adopt the arrangement shown in FIG. 1 or change both in the number of cages and in the relative arrangement of the same.

Figure 2:
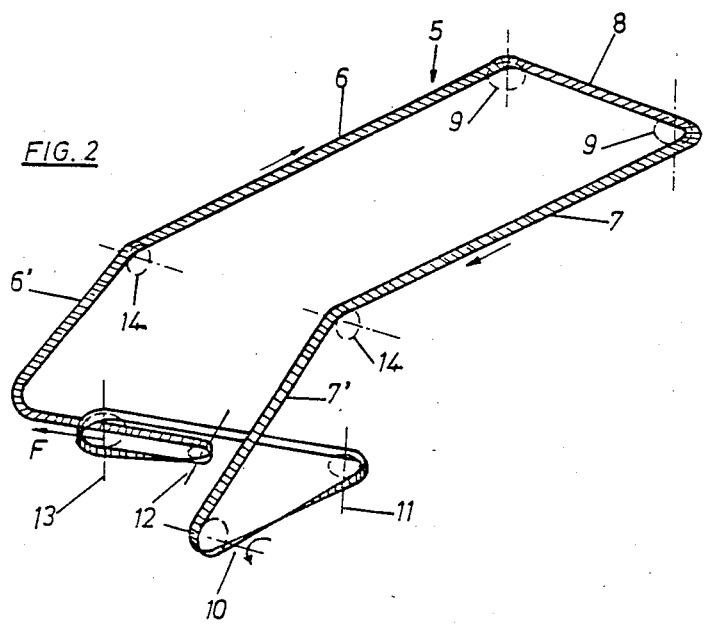
FIG. 2 shows the path of the coupling chain of one of the states of the bank.

According to the present invention, the belt 4 for the gathering of the eggs is formed, in each stage of cages, from a sole coupling chain, the path or course of which is digrammatically shown in FIG. 2. The coupling chain is generally indicated with the reference numeral 5.

As can be seen in this course of FIG. 2, one of the runs of the chain, that will be considered the advancing one and denoted with the reference numeral 6, slides in front of one of the rows of cages of a particular stage, while the reverse run, denoted with the reference numeral 7, slides in front of the other row of cages pertaining to the same stage. The chain 5 surrounds the row of cages with one of its shorter sides, along a transverse run 8. The advancing run 6, the reverse run 7 and the transverse run 8 of each coupling chain are arranged in a common horizontal plane, the change of direction being effected by means of pulleys 9 with vertical axes.

On the opposite shorter side, the advancing runs 6 and the reverse runs 7 extend to pass through a group of wheels 10, 11, 12 and 13 for the traction and change of direction. At the end of the runs 6 and 7, pulleys 14 with horizontal axes are arranged, between which and the group of wheels 11 to 13 for the traction and change of direction, the chain 5 slides along runs with a certain slope, indicated with the reference numerals 6' and 7'.

Figure 3:
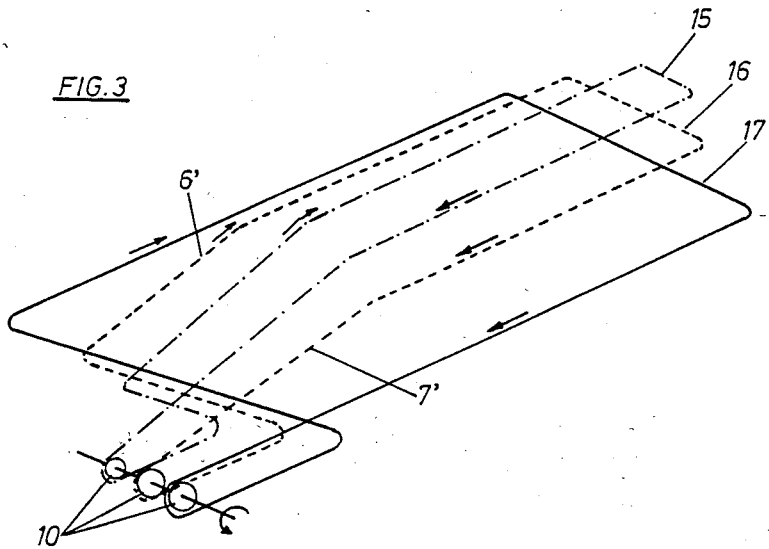
FIG. 3 is a diagram of the paths corresponding to the chains of the three stages of the bank of FIG. 1.

In FIG. 3 it is shown in a diagrammatic and simplified way, the course of the three coupling chains of the bank illustrated in FIG. 1. With the reference numeral 15 and with dash and dotted lines the course of the upper stage is presented, with the reference numeral 16 and dashed lines the course of the intermediate stage is presented, and with full line and the reference numeral 17 is presented the course of the lower stage.

In these courses is presented only the change of direction wheel 10 with horizontal axis of the three courses, whose wheels have a common axis of revolution. With this arrangement, the runs 6' and 7' of the various chains will have a different slope, since the sloping of each starts in the pulleys 14 with horizontal axis, FIG. 2, placed at the level of each stage of cages, and ends at the level corresponding to the common axis of the wheels 10 for the change of direction.

As can be best seen in FIG. 2, the pulley 10 causes the reversal of the chain 5, so that the eggs or the products carried by the coupling chain are discharged at this point. Turning again to FIG. 3, it is seen that the three chains 15, 16 and 17, passing over the reversal pulleys 10 having a common axis, discharge all at the same level.

In the actual application of the present invention, the runs 6' and 7' will have a suitable slope to avoid the fall of the eggs. The various conveyor chains 16, 15, 17 will discharge, due to the reversal effected by the pulleys 10, on a general conveyor belt which slides in front of the various banks of cages.

As can be seen in FIG. 2, through the group of wheels 10, 11, 12 and 13, it is obtained that the chain starts its rising in the sloping run 6 in the right position to effect the gathering of the eggs along the advancing run 6 and the reverse run 7. The pulley 13 can also act as a jockey pulley of the coupling chain. Some of these wheels can also be used as driving wheels.

Figure 4:
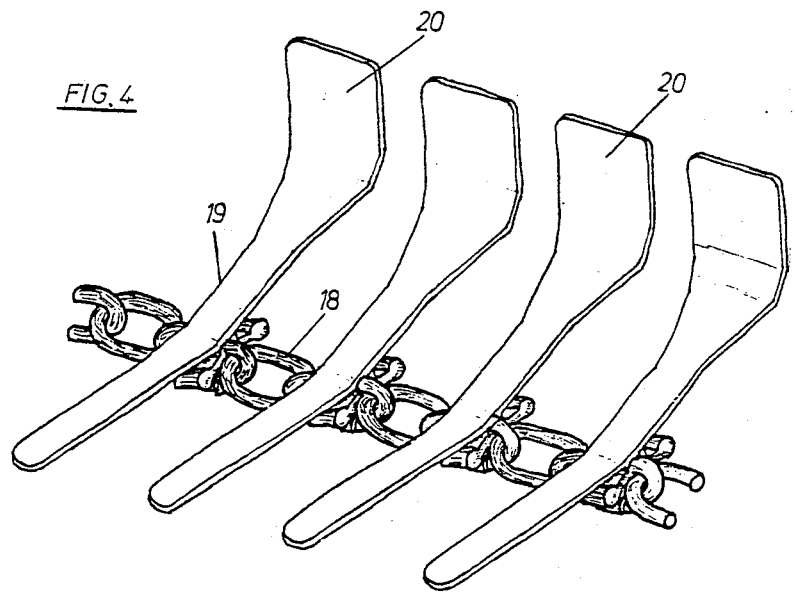
FIG. 4 is a perspective view of a coupling chain embodying the invention.

As can be seen in FIG. 4, the coupling chain is formed by a chain of links 18 and by a train of equidistant arms 19. The adjoining links 18 slide along perpendicular planes, so that half of the links, in the advancing and reverse runs 6 and 7 of the chain, slide along a horizontal plane, while the other half of the links slide in a vertical position. The arms 19 are secured to the links that slide in the advancing and reverse runs 6 and 7, along a vertical plane.

Figure 5:
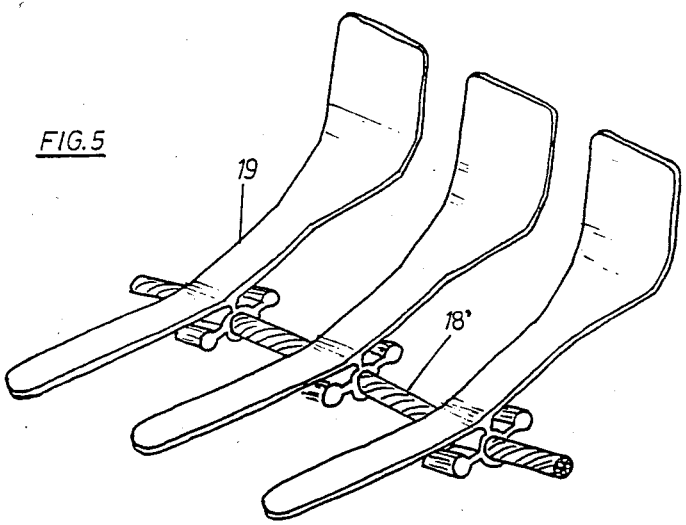
FIG. 5 is a view similar to FIG. 4, showing an alternate embodiment of the coupling chain.

The chain of links 18 could be substituted, as can be seen in FIG. 5, with a resistant cable, for example, metallic, braided, indicated with the reference 18', to which the arms 19 are secured. These arms are preferably obtained from a plastic material and in the embodiment shown in FIG. 5 will be moulded on the cable 18'. As can be seen in FIGS. 4 and 5, the arms 19 are shaped with transverse bends, which define an intermediate zone having a bigger depth, and end at one of their extremities with a side wall or stop 20, as can be best appreciated in FIG. 10. These arms have in their bottom notches 21 and 22 for their pressure engagement upon the runs 23 of the links which slide along vertical planes in the advancing and reverse runs of the chain. Between these notches 21 and 22 there are side projections 24 slightly extending in a lateral direction from the runs 25 of the links which slide in a horizontal direction in the advancing and reverse runs of the chain.

Figure 10:
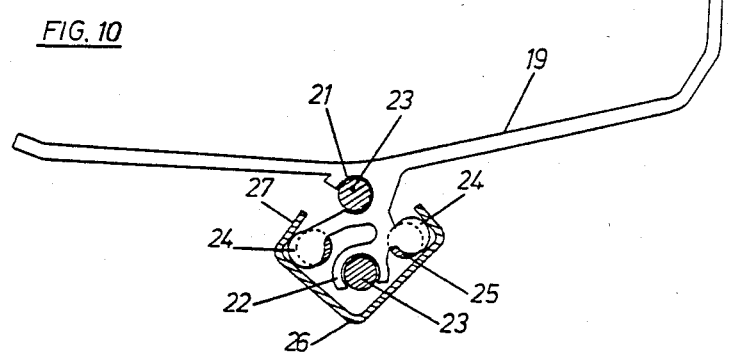
FIG. 10 is a cross-section of the chain mounted on the guide trough.

As can be also appreciated in FIG. 10, the chain of links 18 slides upon guides 26 shaped as a V-trough, whose walls extend from the free edges as flanges slightly converging, bearing the reference numeral 27.

The trough 26 has such a size that none of the links 18 of the chain rubs against the inner surface of said trough. Only the projections 24, made of plastic material, of the arms 19 bear against the inner surface of the trough, so that a smooth and noiseless sliding is obtained. Furthermore, the upper run of the vertical links projects from the free edge of the flanges 27 of the trough, whereby the arms 19 are arranged above said trough.

Figure 6:
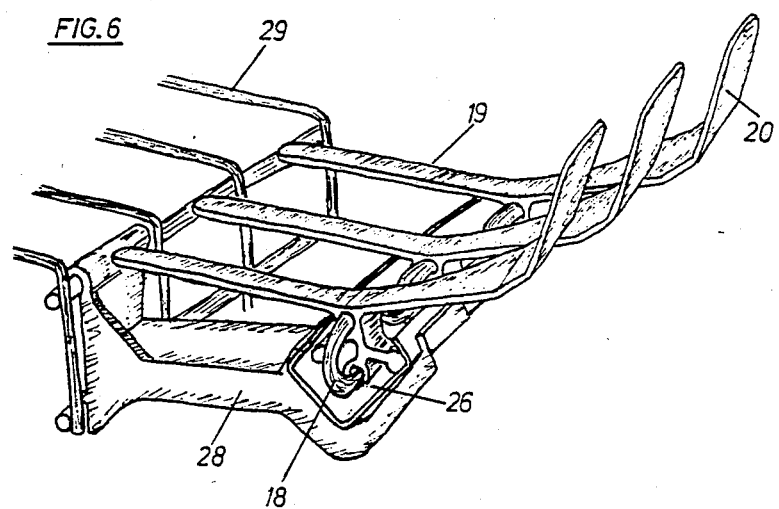
FIG. 6 is a partial perspective view of the couling chain mounted on the cages.

As can be appreciated in FIG. 6, the troughs 26 which act as guides for the chain, are supported on arms 28 which are secured to the cages or the support structure of the same.

As is well known in this kind of cages, the front wall of the same does not arrive to the bottom, so as to form a longitudinal opening through which the eggs can exit, due to the slope of said bottom. According to the present invention, the bottom of the cages, see FIG. 6, extends beyond the front wall of the same in a portion 29 next to which the coupling chain slides, so that the eggs which roll on this portion 29 fall on the arms or cross-bars 19 of the coupling chain. Due to the bends formed in the arms 19, the eggs occupy the central part of the same, between each two successive arms, being prevented, from falling on one hand, by the extensions 29 of the bottom of the cages and, on the other, by the stops or walls 20. The distance between the arms 19 will be such as to allow the positioning of an egg between two of them, while avoiding their rolling along the sloping runs 6' and 7'.

In FIG. 7 is presented one of the pulleys 9, FIG. 2, with vertical axis, which allows the change of direction in the movement of the coupling chain, keeping in a coplanar position the consecutive runs 6, 7 and 8. The lower projections 24 of the arms serve for the support on the pulley 9. In the case of FIG. 8, is presented one of the pulleys 14 with horizontal axis, starting from which the coupling chain slides with a certain slope in the runs 6' and 7', FIG. 2. Also in this case, the projections 24, in addition to their own links of the chain, serve so that the latter be guided by the pulley 14.

Figure 9:
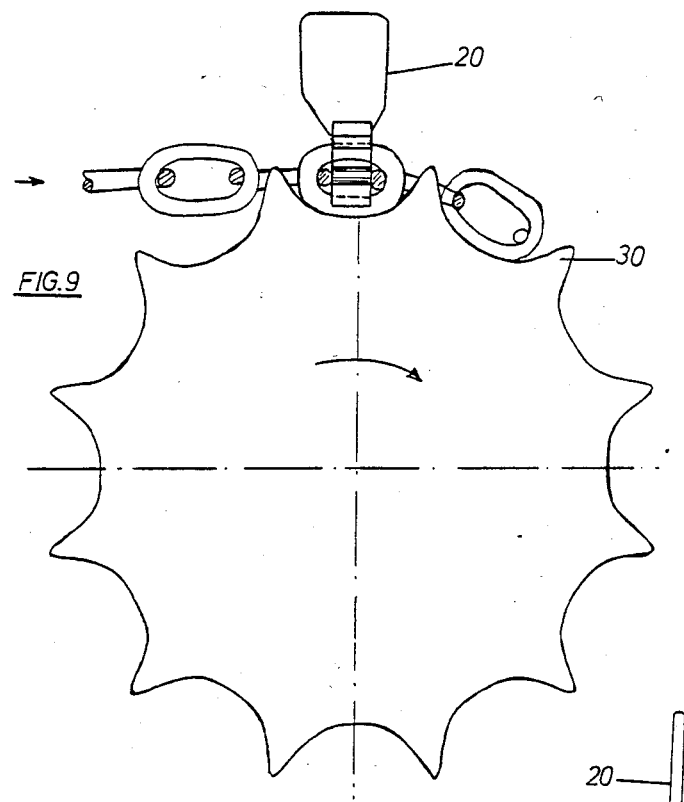
FIG. 9 is a side view of a gear for the traction of the chain.

Finally, in FIG. 9, a traction wheel is presented with teeth 30 having a profile and a distance apt to receive between two successive teeth one of the vertical links of the chain, while the teeth 30 pass through the horizontal links.

Another of the advantages of the plant according to the invention consists in the fact that the eggs which break, can easily fall through the arms or cross-bars 19, without soiling the remainder of the eggs which are on the same chain or in lower chains.

I claim:

1. Apparatus for gathering eggs in banks of cages having exits for chickens with the cages in stages each having two rows, characterized in that a sole endless coupling chain is arranged in each stage of the bank, an advancing run of which slides in front of the exits of the cages of one row, while a reverse run slides in front of the exits of the cages of the other row, said two runs being placed in the same horizontal plane; said chain slides on guides fixed to the bank of cages and surrounds said bank along a transverse run in the same plane as said advancing and reverse runs, being supported upon wheels with vertical axes; for a change of direction of said chain along the side opposite said transverse run, said advancing and reverse runs of all of said chains are extended in order to pass through a group of traction and change of direction wheels, said advancing and reverse runs carrying the eggs of all of said chains to arrive at a group of wheels having a common horizontal axis for a change of direction, which causes the reversal of said chains and the discharge upon a same plane receiving the eggs.

2. Apparatus as claimed in claim 1, characterized in that said coupling chain of each stage comprises a chain of links, and a plurality of equidistant arms of plastic material extending transversely of said chain of links which are fixed at the upper part of alternate links, with an arm on each link that slides along a vertical plane in said advancing and reverse runs of said coupling chain, so as to define, in said runs, a train of parallel cross-bars apt to receive and displace eggs arriving from the cages.

3. Apparatus as claimed in claim 2, characterized in that the bottom of the cages arrives to a surface formed by said arms of the chain, in said advancing and reverse runs of said chain.

4. Apparatus as claimed in claim 2, characterized in that said arms present, in the zone of connection with said links, lateral projections which are arranged on both sides of said links and are substantially coplanar with those of said links devoid of arms, in respect of which they project laterally, so as to act as supporting pads engaging said guides.

5. Apparatus as claimed in claim 1, characterized in that said guides for links of said chain comprise a guide trough formed from a trough-shaped section, with walls arranged as a V, which extend, starting from an upper edge of said walls, as flanges slightly converging toward the interior of said V and forming an obtuse angle with said walls, the maximum width and heighth of said guide trough being slightly bigger and smaller, respectively, than the width of the links, so that a branch of said links carrying transverse arms projects from between said flanges.

6. Apparatus as claimed in claim 5, characterized in that said guide troughs are mounted on arms secured to the cages or a frame of the bank.

7. Apparatus as claimed in claim 5, characterized in that said transverse arms present lateral projections which are arranged on both sides of said links and are substantially coplanar with said links which are devoid of arms, in respect of which they project laterally, so as to act as supporting pads sliding against the inner surface of said guide trough, in the area of maximum width of said trough, all of said links of said chain being spaced from the inner surface of said trough.

8. Apparatus as claimed in claim 7, characterized in that said guide troughs are mounted on arms secured to the cages or a frame of the bank.

9. Apparatus for gathering eggs in banks of cages having exits for chickens with the cages in stages each having two rows, characterized in that a sole endless coupling cable is arranged in each stage of the bank, an advancing run of which slides in front of the exits of the cages of one row, while a reverse run slides in front of the exits of the cages of the other row, said two runs being placed in the same horizontal plane; said cable slides on guides fixed to the bank of cages and surrounds said bank along a transverse run in the same plane as said advancing and reverse runs, being supported upon wheels with vertical axes; for a change of direction of said cable along the side opposite said transverse run, said advancing and reverse runs of all of said cables are extended in order to pass through a group of traction and change of direction wheels, said advancing and reverse runs carrying the eggs of all of said cables to arrive at a group of wheels having a common horizontal axis for a change of direction, which causes the reversal of said cables and the discharge upon a same plane receiving the eggs.

10. Apparatus as claimed in claim 9, characterized in that said cable has equidistant arms transversely fixed thereon and conformed to form a train of cross-bars apt to receive and displace the eggs arriving from the cages.

11. Apparatus as claimed in claim 10, characterized in that said arms are made from plastic material and are moulded on said cable, and formed, under said arms, are projections which slidingly move on guides.

12. Apparatus as claimed in claim 10, characterized in that the bottom of the cages arrives to a surface formed by the transverse arms of said cable, in the advancing and reverse runs of said cable.

* * * * *